United States Patent [19]
Heine

[11] Patent Number: 5,556,249
[45] Date of Patent: Sep. 17, 1996

[54] CARGO LOADING AND UNLOADING SYSTEM FOR USE WITH UTILITY VEHICLE HAVING BED

[76] Inventor: Daniel M. Heine, 3010B W. 107th Pl., Westminster, Colo. 80030

[21] Appl. No.: 488,847

[22] Filed: Jun. 9, 1995

[51] Int. Cl.$^6$ ............................................. B60P 1/43
[52] U.S. Cl. .................... 414/500; 414/477; 414/494; 414/538
[58] Field of Search .................... 414/477–480, 414/491, 494, 500, 537, 538, 559, 522

[56] References Cited

U.S. PATENT DOCUMENTS

| | | | |
|---|---|---|---|
| 404,688 | 6/1889 | Davis | 414/500 |
| 1,677,733 | 7/1928 | Schiftner | 414/538 |
| 3,376,987 | 4/1968 | Lohse | 414/477 |
| 3,497,094 | 2/1970 | Conner et al. | |
| 3,687,314 | 8/1972 | Haugland | |
| 3,877,594 | 4/1975 | Coakley | 414/538 X |
| 3,883,020 | 5/1975 | Dehn | |
| 3,964,626 | 6/1976 | Arregui | 414/500 X |
| 4,212,580 | 7/1980 | Fluck | 414/559 X |
| 4,655,671 | 4/1987 | Pratt | 414/477 |
| 4,930,799 | 6/1990 | Pihlström et al. | 414/494 X |
| 4,986,719 | 1/1991 | Galbreath | 414/494 X |
| 4,990,049 | 2/1991 | Hargrove | 414/537 |
| 5,213,466 | 5/1993 | Bubik | 414/494 |
| 5,232,329 | 8/1993 | Livingston | 414/494 |
| 5,234,307 | 8/1993 | Scott | 414/467 |
| 5,249,910 | 10/1993 | Ball | 414/538 |
| 5,269,642 | 12/1993 | Zoromski | 414/392 |
| 5,447,408 | 9/1995 | Smith | 414/538 |

FOREIGN PATENT DOCUMENTS

| | | | |
|---|---|---|---|
| 0481367 | 4/1992 | European Pat. Off. | 414/480 |
| 2686843 | 8/1993 | France | 414/480 |

*Primary Examiner*—James W. Keenan
*Attorney, Agent, or Firm*—John R. Flanagan

[57] ABSTRACT

A cargo loading and unloading system for use with a utility vehicle having a bed includes a movable sled for retaining cargo items, a platform mountable to the bed of the utility vehicle for receiving thereon the sled, a ramp for receiving thereover the sled and for facilitating the moving the sled up onto and down from the platform, and a flexible mechanism interconnecting the platform and the sled for controlling the movement of the sled between the ground and the bed of the utility vehicle. The sled has a base, wheels for moving the sled on a support surface and a pair of spaced apart inner longitudinal members which are disposed between the opposite sides of the base. The platform includes a base and a pair of guide rollers disposed above and mounted to the end of the base at the rear end of the utility vehicle bed. The guide rollers mesh with the inner longitudinal members of the sled for the purpose of guiding the sled between the ramp and the platform. The ramp contacts the ground at one end to support the ramp in an inclined orientation such that a second end is engaged with the platform at the rear end of the bed.

15 Claims, 2 Drawing Sheets

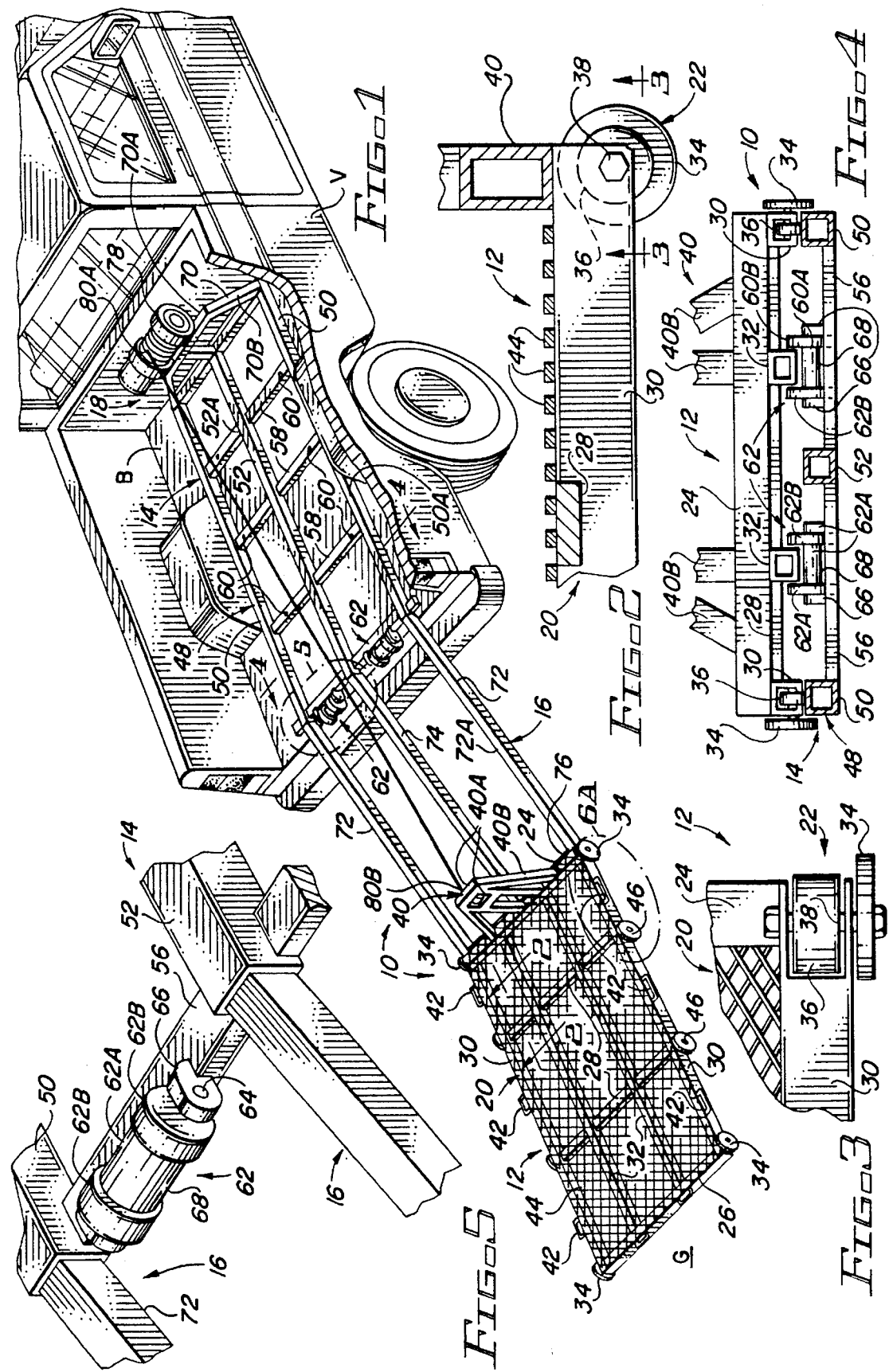

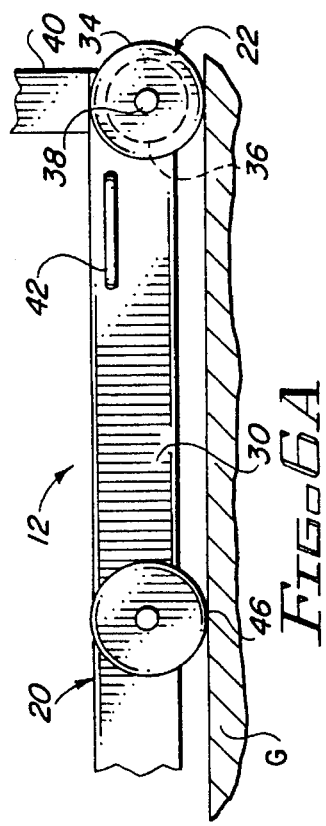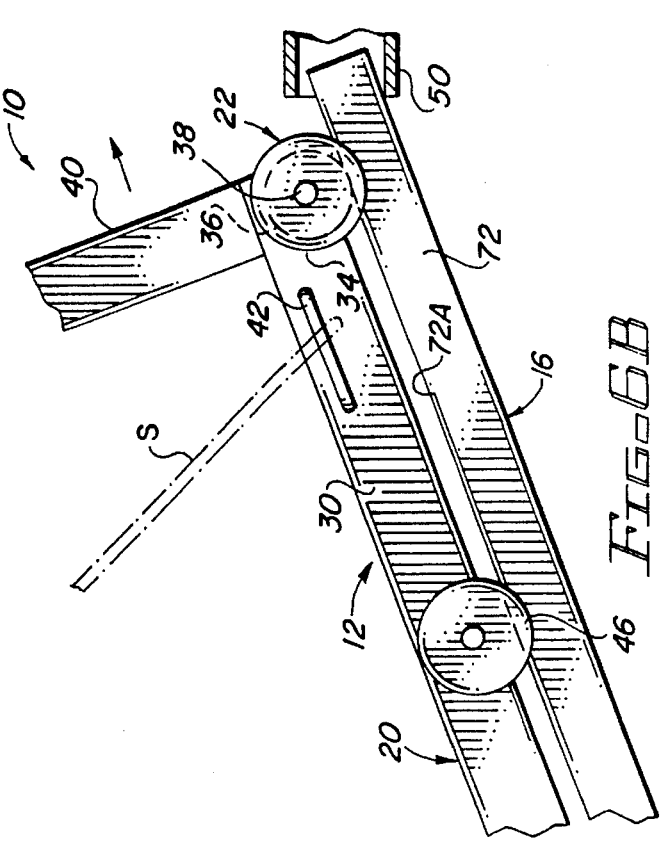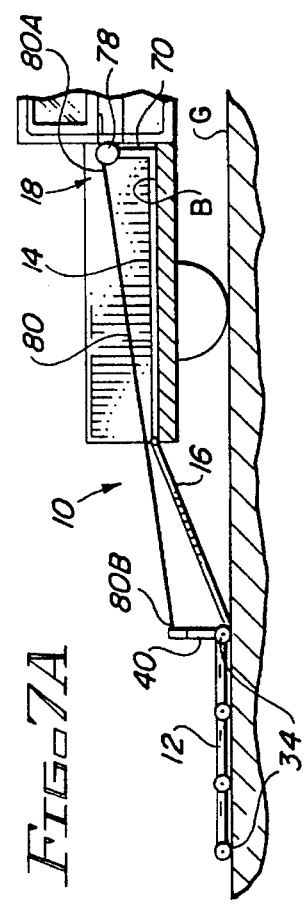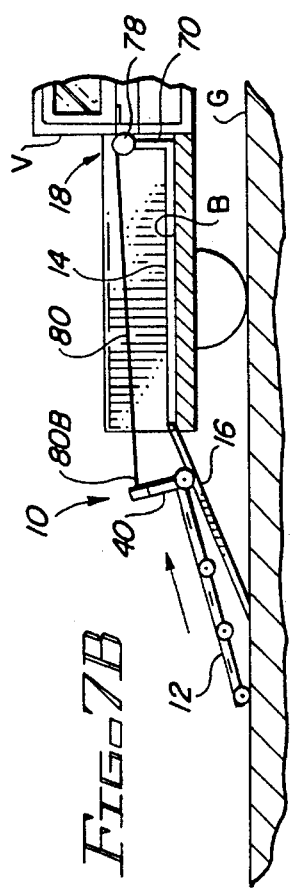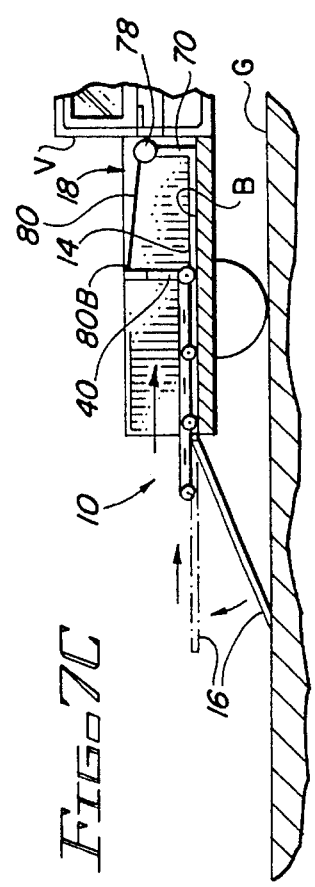

CARGO LOADING AND UNLOADING SYSTEM FOR USE WITH UTILITY VEHICLE HAVING BED

BACKGROUND OF THE INVENTION

1. Field of the Invention

The present invention generally relates to cargo handling systems and, more particularly, is concerned with a cargo loading and unloading system for use with a utility vehicle having a bed useable with a variety of cargo items at all stages of the loading and unloading process.

2. Description of the Prior Art

Utility vehicles such as pickup trucks and flatbed vehicles are often used to transport cargo which is too heavy or cumbersome to carry along the ground or to lift up onto the bed of a large truck. Mechanical assistance has therefore been required to load and unload such heavy or cumbersome items to and from the vehicle bed. Various cargo loading and unloading systems have been developed over the years to enable a user to utilize the full capabilities of these utility vehicles.

Representative examples of these systems and other related systems are disclosed in U.S. Pat. No. 3,497,094 to Conner et al, U.S. Pat. No. 3,687,314 to Haugland, U.S. Pat. No. 3,883,020 to Dehn, U.S. Pat. No. 4,990,049 to Hargrove, U.S. Pat. No. 5,232,329 to Livingston, U.S. Pat. No. 5,234,307 to Scott, U.S. Pat. No. 5,249,910 to Ball and U.S. Pat. No. 5,269,642 to Zoromski.

Common elements in many of these systems include winch and cable assemblies, ramps, bed liners and/or platforms of various types. A problem exists, however, in that none of these systems appear to provide a comprehensive solution for loading and unloading a variety of heavy or cumbersome cargo onto utility vehicles. The prior art systems appear only to be effective with certain types of cargo and/or certain stages of the loading and unloading process.

Consequently, a need still exists for a solution which is comprehensive in scope and overcomes the aforementioned problems in the prior art systems without introducing any new problems in their place.

SUMMARY OF THE INVENTION

The present invention provides a cargo loading and unloading system designed to satisfy the aforementioned need in the prior art. The cargo loading and unloading system of the present invention is applicable for use with a utility vehicle having a bed. The system provides a comprehensive solution with universal application in that it may be employed with a variety of cargo items and at all stages of the loading and unloading process.

Accordingly, the present invention is directed to a cargo loading and unloading system for use with a utility vehicle having a bed. The system comprises: (a) a movable sled for retaining cargo items; (b) a platform mounted to the bed of the utility vehicle for receiving thereon the sled; (c) a ramp for receiving thereover the sled and for facilitating moving the sled up onto and down from the platform; and (d) means interconnecting the platform and the sled for controlling the movement of the sled between the ground and the bed of the utility vehicle.

More particularly, the sled includes a base having a pair of opposite ends, a pair of opposite sides, means on the base for moving the sled on a support surface and a pair of spaced apart inner longitudinal members which extend between and interconnect the opposite ends and are spaced inwardly from the opposite sides of the base. The platform includes a base having a pair of opposite ends, a pair of opposite sides and a pair of guide rollers mounted to one of the opposite ends of the base at the rear end of the utility vehicle bed. The guide rollers are adapted for receiving and meshing with the inner longitudinal members of the sled for guiding the sled from the ramp and onto the platform. The ramp includes a pair of opposite sides and a pair of opposite ends. A first of the opposite ends of the ramp is for contacting the ground to support the ramp in an inclined orientation such that a second of the opposite ends of the ramp is engaged with the platform at the rear end of the bed.

Also, the moving means on the base of the sled is preferably a pair of outer wheels attached adjacent to each of the opposite ends along the opposite sides of the base and a pair of inner wheels attached underneath each of the opposite ends so as to extend below the base adjacent to the opposite sides of the base and disposed adjacent to and inwardly of the outer wheels. The outer wheels further have a diameter greater than the diameter of the inner wheels. The outer wheels are thus adapted for supporting and moving the sled on the ground whereas the inner wheels are adapted for moving the sled along the ramp and platform.

Furthermore, the means interconnecting the platform and sled for controlling the movement of the sled between the ground and the bed of the utility vehicle is preferably a winch and cable assembly. The winch is substantially cylindrical in shape and is mounted to the front end of the platform. The cable has a pair of opposite ends, a first of which is attached to the winch and a second of which is attached to the sled for controlling the movement of the sled between the ground and the utility vehicle bed upon selected operation of the winch.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a top perspective view of the cargo loading and unloading system of the present invention for use with a utility vehicle having a bed.

FIG. 2 is an enlarged fragmentary partially cross-sectional side elevational view of a movable sled of the cargo loading and unloading system taken along line 2—2 of FIG. 1.

FIG. 3 is an enlarged fragmentary bottom plan view of the sled taken along line 3—3 of FIG. 2.

FIG. 4 is an enlarged fragmentary partially cross-sectional front elevational view of the sled on a platform of the system taken along line 4—4 of FIG. 1.

FIG. 5 is an enlarged fragmentary top perspective view of the area of the system enclosed by circle 5 of FIG. 1.

FIG. 6A is an enlarged fragmentary side elevational view of the area of the sled enclosed by circle 6A of FIG. 1.

FIG. 6B is an enlarged fragmentary side elevational view of the sled on a ramp of the system.

FIG. 7A is a schematic side elevational view of the system at the start of the loading process with the sled on the ground.

FIG. 7B is a schematic side elevational view of the system during the loading process with the sled moving up the ramp.

FIG. 7C is a schematic side elevational view of the system near the end of the loading process with the sled on the platform on the bed of the utility vehicle and with the ramp being lifted to store it into the platform.

DETAILED DESCRIPTION OF THE INVENTION

Referring to the drawings and particularly to FIG. 1, there is illustrated a cargo loading and unloading system, generally designated 10, of the present invention for use with a utility vehicle V, such as a pickup, having a flat bed B. The system 10 is usable with a variety of cargo items at all stages of the loading and unloading process.

Basically, the cargo loading and unloading system 10 includes a movable sled 12 for securing and retaining cargo items (not shown), a platform 14 mounted to the bed B of the utility vehicle V for receiving thereon the sled 12, a ramp 16 for receiving thereover and for facilitating the moving the sled 12 up onto and down from the platform 14, and means 18 interconnecting the platform 14 and the sled 12 for controlling the movement of the sled 12 between the ground G and the bed B of the utility vehicle V. The sled 12, the platform 14 and the ramp 16 have substantially rigid constructions and are made of a material of high strength and durability, such as steel or aluminum.

Referring now particularly to FIGS. 1 to 3, 6A and 6B, the movable sled 12 of the system 10 includes a base 20 having a pair of opposite forward and rearward ends, a pair of opposite sides and means 22 on the base 20 for facilitating moving the sled 12 on a support surface, such as the ground G. The base 20 is a rigid framework formed of a pair of opposite transverse forward and rearward end members 24, 26 located at the forward and rearward ends of the base 20, a pair of inner transverse members 28 spaced apart from one another and inwardly from the transverse forward and rearward end members 24, 26, a pair of opposite outer longitudinal side members 30 located at the opposite sides of the base 20, a pair of inner longitudinal members 32 spaced apart from one another and inwardly from the longitudinal side members 28. The tranverse forward and rearward end members 24, 26 and inner transverse members 28 extend between and rigidly attach to the outer longitudinal side members 30 and inner longitudinal members 32. As will become clear below, the inner longitudinal members 32 of the sled 12 are provided for meshing with complementary components on the platform 14 for guiding movement of the sled 12 between the ramp 16 and the platform 14.

The means 22 on the sled 12 for facilitating moving of the sled 12 preferably is a pair of outer wheels 34 disposed along the outer longitudinal side members 30 adjacent to the opposite ends of the forward and rearward end members 24, 26 and a pair of inner wheels 36 disposed inwardly from and adjacent to the outer wheels 34 and underneath the outer longitudinal side members 30. As best seen in FIGS. 2, 3, 6A and 6B, the outer wheels 34 and inner wheels 36 are rotatably mounted by common axles 38 mounted through the opposite ends of the outer longitudinal side members 30. Also, the outer wheels 34 have a diameter greater than the diameter of the inner wheels 36. The larger-diameter outer wheels 34 which extend farther below the base 20 of the sled 12 than the smaller-diameter inner wheels 36 are thus adapted to engage the ground G for rollably moving the sled 12 across the ground G. In view that the sled 12, ramp 16 and platform 14 have the similar widths, the outer wheels 34 will extend along the outer sides of the ramp 16 and platform 14 and not ride thereupon, while the smaller-diameter inner wheels 36 are thus adapted to engage and rollably ride upon the ramp 16 and platform 14 for rollably moving the sled 12 on and relative to the ramp 16 and the platform 14.

The sled 12 further includes a mast 40 supported rigidly upon and rising substantially vertically upward from the transverse forward end member 24 of the base 20 of the sled 12. The mast 40 is a rigid framework constructed of a pair of upper horizontal members 40A vertically spaced from one another and a plurality of vertical and angled legs 40B rigidly attached to the horizontal members 40A and rigidly attached at lower ends to the transverse forward end member 24. As will become clear below, the mast 40 provides a part of the sled movement controlling means 18 described below.

The sled 12 also includes a plurality of handles 42, a rigid top grid or screen 44, and a plurality of lateral stabilizing elements 46. The handles 42 of generally inverted U-shape are spaced apart from one another and rigidly connected to and extend outward from the outer longitudinal side members 30 and the transverse forward and rearward end members 24, 26 of the base 20 for use in conjunction with flexible straps or rope S (see FIG. 6B) for tying down cargo items to the sled. The screen 44 is rigidly attached upon and covers the rigid framework of the base 20 so as to provide a surface for receiving and holding cargo items thereon. The screen 44 has a substantially criss-crossing design forming a tread-like pattern so as to provide a gripping surface and thereby reduce slippage of cargo items loaded thereon. The plurality of stabilizing elements 46 are preferably in the form of additional wheels 46, similar to wheels 34, rotatably mounted to outer side surfaces of the outer longitudinal side members 30 of the sled 12 and extending downward below the base 20 of the sled 12 in a closely spaced relationship to opposite sides of the ramp 16 and the platform 14. In such relationships, the stabilizing wheels 46 are adapted to contact the opposite sides of the ramp 16 and the platform 14 so as to prevent significant lateral movement of the sled 12 while moving on the ramp 16 and the platform 14.

Referring now particularly to FIGS. 1, 4 and 5, the platform 14 of the system 10 includes a base 48 having a pair of opposite forward and rearward ends and a pair of opposite sides. The platform 14 is a rigid framework formed of a pair of outer longitudinal side beams 50 and an inner or middle longitudinal beam 52 spaced inwardly from and extending in a substantially parallel relation to the outer longitudinal side beams 50. The rigid framework of the platform 14 also includes a pair of opposite forward and rearward end cross bars 54, 56 and intermediate cross bars 58 spaced from one another and from the opposite forward and rearward end cross bars 54, 56. The cross bars 54, 56, 58 extend between and are rigidly attached to the outer and middle longitudinal beams 50, 52. The outer and middle longitudinal beams 50, 52 are preferably rigid hollow tubes being of rectangular shape in cross-section. The outer longitudinal side beams 50 of the platform 14 are spaced apart from one another at the same distance as are the outer longitudinal side members 30 of the movable sled 12 from one another so that the inner wheels 36 of the sled 12 will rollably engage and rest upon the upper flat surfaces 50A of the outer longitudinal side beams 50 of the platform 14 when the sled 12 is positioned upon the platform 14. The platform 14 is preferably anchored to the flat bed B of the vehicle V by bolts 60 which extend downwardly through the intermediate cross bars 58 of the platform and the bed B.

The platform 14 further includes a pair of guide rollers 62 rotatably mounted by axles 64 extending between spaced tabs 66 rigidly attached to the rearward end cross bar 56 between the outer longitudinal side beams 50 and the middle longitudinal beam 52. The guide rollers 62 are the complementary components on the platform 14 which were referred to above as being adapted to receive and mesh with the inner longitudinal members 32 of the movable sled 12 for guiding the sled 12 from the ramp 16 and onto the platform 14 during loading and vice versa during unloading. Each of the guide rollers 62 has a cylindrical middle section 62A with a smaller diameter than a pair of cylindrical opposite end sections 62B so as to define an annular recessed channel 68 extending about the middle section 62A of the guide roller 62. Each guide roller 62 extends above the rearward end cross bar 56 such that the upper side of the channel 68 is approximately at the same elevation as the upper flat surfaces 50A, 52A of the outer and middle longitudinal beams 50, 52. Also, the channel 68 has a width slightly larger than that of inner longitudinal members 32 of the sled 12 so that the inner longitudinal members 32 of the sled 12 will mesh therewithin and be received therethrough so as to ease the transfer of the sled 12 between the ramp 16 and platform 14 and at the same time prevent the sled 12 from shifting from side to side while the sled 12 is being moved onto or from the platform 14.

As best seen in FIG. 4, the forward, rearward and inner transverse members 24, 26, 28 of the sled 12 each has a substantially smaller cross-sectional thicknesses than each of the outer and inner longitudinal members 30, 32 and extend between and connect with upper longitudinal portions thereof so as to provide enough clearance below the base 20 between lower longitudinal portions of the outer and inner longitudinal members 30, 32 to allow the lower portion of the inner longitudinal members 32 to be received through the channels 68 of the guide rollers 62 rotatably mounted on the rear end of the platform 14. Similarly, as best seen in FIG. 4, the forward, rearward and intermediate cross bars 54, 56, 58 of the platform 14 each has a substantially smaller cross-sectional thickness than each of the outer and middle longitudinal beams 50, 52 and extend between and connect with lower longitudinal portions thereof so as to provide clearance between upper portions thereof to allow the inner longitudinal members 32 of the sled 12 when received on the guide rollers 62 to pass over the forward, rearward and intermediate cross bars 54, 56, 58 of the platform 14 as the sled 12 moves over and relative to the platform 14.

The platform 14 further includes an upright brace 70 supported rigidly upon and rising substantially vertically upward from the front ends of the outer and inner longitudinal beams 50, 52 of the base 48 of the platform 14. The upright brace 70 is a rigid framework constructed of an upper horizontal member 70A and a plurality of vertical and angled legs 70B rigidly attached to the horizontal members 70A and rigidly attached at lower ends to the respective front ends of the outer and inner longitudinal beams 50, 52. As will become clear below, the upright brace 70 also provides a part of the sled movement controlling means 18 to be described below.

Referring now to FIGS. 1, 5 and 6B, the ramp 16 of the system 10 includes a pair of opposite sides and a pair of opposite ends. A first of the ends of the ramp 16 is adapted for contacting the ground G while a second of the ends thereof is adapted for engaging the rear end of the platform 14 at the rear end of the vehicle bed B. The ramp 16 is a rigid framework formed of a pair of opposite outer longitudinal side rails 72 located at the opposite sides of the ramp 16, an inner or middle longitudinal rail 74 spaced inwardly from the outer longitudinal side rails 72 and extending in a substantially parallel relation thereto. The framework of the ramp 16 also includes a transverse end bar 76 extending between and rigidly attached to the rear ends of the outer and middle longitudinal rails 72, 74. Thus, the transverse end bar 76 is located at the rear end of the ramp 16, whereas at the front end of the ramp 16 the front ends of the outer and middle longitudinal rails 72, 74 are not attached to one another. The outer longitudinal rails 72 are spaced apart through the same distance as the outer longitudinal members 30 of the sled 12 and the outer longitudinal beams 50 of the platform 14 such that the inner wheels 36 which rollably engage and rest upon the upper flat surfaces 50A of the outer longitudinal beams 50 of the platform 14 are received over and rollably engaged upon the upper flat surfaces 72A of the ramp 16 for facilitating the moving of the sled 12 up onto and down from the platform 14. As best seen in FIG. 1, the transverse rear bar 76 of the ramp 16 contacts the ground G so as to support the ramp 16 in an inclined orientation such that the front ends of the outer and middle longitudinal rails 72, 74 of the ramp 16 are engaged with rear ends of the outer and middle longitudinal beams 50, 52 of the platform 14. The outer and middle longitudinal rails 72, 74 of the ramp 16 are substantially similar in shape as, but have slightly smaller dimensions than the outer and middle longitudinal beams 50, 52 of the platform 14 such that the outer and middle longitudinal rails 72, 74 of the ramp 16 are telescopically receivable within the corresponding outer and middle longitudinal side beams 50, 52 of the platform 14 during periods when the ramp 16 is not being used. Thus, this telescoping feature provides for efficient and convenient storage of the ramp 16 after the cargo is loaded onto or unloaded down from the platform 14.

Finally, referring now particularly to FIGS. 1, 7A, 7B and 7C, the means 18 of the system 10 interconnecting the platform 14 and the sled 12 for controlling the movement of the sled 12 between the ground G and the bed B of the utility vehicle V preferably includes an assembly of a winch 78 and cable 80, in addition to the upright mast 40 on the fronts end of the sled 12 and the upright brace 70 on the front end of the platform 14. The winch 78 is substantially cylindrical in shape and rotatably mounted to the upright brace 70 on the front end of the platform 14. The cable 80 has a pair of opposite front and rear ends 80A, 80B. The front end 80A is attached to the winch 78 and the rear end 80B is attached to the upright mast 40 on the front end of the sled 12.

To load the sled 12, as seen in FIG. 7A, the sled 12 is placed with its front end adjacent to the rear end of the ramp 16 and in alignment therewith and the rear end 80B of the cable 80 is attached to the upright mast 40 of the sled 12. Then, the winch 78 is operated to cause the cable 80 to wind thereabout and draw the sled 12 over and up the ramp 16 and onto and across the platform 14, as depicted in FIGS. 7B and 7C. Once the sled 12 is fully positioned on the platform 14, winch 78 is shut off and the ramp 16 can now be lifted and telescopically stored in the platform 14, as explained above. To unload the sled 12, the above-described steps are performed in reverse.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A cargo loading and unloading system for a utility vehicle having a bed, said system comprising:
   (a) a movable sled for retaining cargo items, said sled including
      (i) a base having a pair of opposite ends and a pair of opposite sides,
      (ii) a pair of outer wheels attached adjacent to each of said opposite ends along said opposite sides of said base, said outer wheels being adapted for moving said sled on the ground, and
      (iii) a pair of inner wheels attached underneath each of said opposite ends of said base so as to extend below said base adjacent to said opposite sides thereof and substantially adjacent to said outer wheels;
   (b) a platform mountable to the bed of the utility vehicle for receiving thereon said sled, said platform including a base having a pair of opposite sides;
   (c) a ramp for receiving thereover said inner wheels of said sled for facilitating moving said sled up onto and down from said platform, said ramp including a pair of opposite sides and a pair of opposite ends, a first of said opposite ends of said ramp for contacting the ground to support said ramp in an inclined orientation such that a second of said opposite ends of said ramp is engaged with said platform at a rear end of the bed; and
   (d) means interconnecting said platform and said sled for controlling the movement of said sled between the ground and the bed of the utility vehicle.

2. The system of claim 1 wherein said base of said sled further has a pair of spaced apart inner longitudinal members which extend between and interconnect said opposite ends of said base and are spaced inwardly from said opposite sides of said base.

3. The system of claim 2 wherein said base of said platform further has a pair of opposite ends and a pair of guide rollers mounted to one of said opposite ends of said base at a rear end of the utility vehicle bed, said guide rollers being adapted for receiving and meshing with said inner longitudinal members of said sled for guiding said sled from said ramp and onto said platform.

4. The system of claim 3 wherein said pair of guide rollers are substantially cylindrical in shape and have a middle section with a smaller diameter than a pair of opposite end sections so as to define a recessed channel for meshing with and receiving therethrough said pair of inner longitudinal members of said sled to prevent said sled from shifting from side to side while moving onto said platform.

5. The system of claim 1 wherein said sled further includes a plurality of handles connected to said opposite sides and said opposite ends of said base for tying down cargo items.

6. The system of claim 1 wherein said sled further includes a screen mounted to and covering said base and providing said base with a gripping surface for receiving and supporting cargo items.

7. The system of claim 1 wherein said sled further includes a plurality of stabilizing elements attached to said opposite sides of said base and extending downwardly below said base for contacting said opposite sides of said ramp and said platform so as to prevent significant lateral movement of said sled while moving on said ramp and said platform.

8. The system of claim 1 wherein said outer wheels of said sled have a diameter greater than the diameter of said inner wheels of said sled.

9. A cargo loading and unloading system for a utility vehicle having a bed, said system comprising:
   (a) a movable sled for retaining cargo items, said sled including
      (i) a base having a pair of transverse opposite end members, a pair of opposite outer longitudinal side members, said transverse end members extending between and attached to said longitudinal side members, and a pair of spaced apart inner longitudinal members extending in substantially parallel relation to one another and to and spaced inwardly from said outer longitudinal side members and between and attached to said transverse end members,
      (ii) a mast supported on and rising substantially vertically from a first of said transverse end members of said base at front ends of said inner longitudinal members,
      (iii) a pair of outer wheels rotatably mounted adjacent to opposite ends of each of said transverse end members of said base along said longitudinal side members of said base, said outer wheels being rotatable and thereby adapted for moving said sled on the ground, and
      (iv) a pair of inner wheels attached underneath said longitudinal side members of said base so as to extend below said base adjacent to said opposite sides thereof and substantially adjacent to said outer wheels;
   (b) a platform mountable to the bed of the utility vehicle for receiving thereon said sled, said platform including
      (i) a base having a pair of opposite outer longitudinal side beams, an inner longitudinal beam spaced inwardly from said longitudinal side beams and extending in substantially parallel relation thereto, and a pair of opposite outer end cross bars extending between and interconnecting with said longitudinal side beams and said inner longitudinal beam, said longitudinal side beams for receiving thereon said inner wheels of said sled,
      (ii) a brace supported on and rising substantially vertically from said longitudinal side beams and said inner longitudinal beam of said platform adjacent to a front end of the bed, and
      (iii) a pair of guide rollers mounted to one of said outer end cross bars of said platform at a rear end of the bed and disposed above said one outer end cross bar of said platform for receiving and meshing with and guiding said pair of inner longitudinal members of said sled;
   (c) a ramp including
      (i) a pair of opposite outer longitudinal side rails,
      (ii) an inner longitudinal rail spaced inwardly from said longitudinal side rails and extending in substantially parallel relation thereto, and
      (iii) a transverse end bar connected to first ends of said longitudinal side rails and said inner longitudinal rail, said transverse end bar for contacting the ground to support said ramp in an inclined orientation such that second ends of said longitudinal side rails and said inner longitudinal rail are engaged with ends of said longitudinal side beams and said inner longitudinal beam of said platform, said longitudinal side rails for receiving thereover said inner wheels of said sled for facilitating moving said sled up onto and down from said platform;
   (d) a winch mounted to said brace of said platform; and
   (e) a cable having a pair of opposite ends, a first of said ends being attached to said winch and a second of said ends being attached to said mast of said sled for controlling the movement of said sled between the ground and the bed of the utility vehicle upon selected operation of said winch.

10. The system of claim 9 wherein said sled further includes a plurality of handles connected to said longitudinal side members and said transverse end members of said base for tying down cargo items.

11. The system of claim 9 wherein said sled further includes a screen mounted to and covering said base and providing said base with a gripping surface for receiving cargo items.

12. The system of claim 9 wherein said sled further includes a plurality of stabilizing elements attached to said longitudinal side members of said base and extending downwardly below said base for contacting said longitudinal side rails of said ramp and said longitudinal side beams of said platform so as to prevent significant lateral movement of said sled while moving on said ramp and said platform.

13. The system of claim 9 wherein said outer wheels of said sled have a diameter greater than the diameter of said inner wheels of said sled.

14. The system of claim 9 wherein said pair of guide rollers are substantially cylindrical in shape and further have a middle section with a smaller diameter than a pair of opposite end sections so as to define a recessed channel for meshing with and receiving therethrough said pair of inner longitudinal members of said sled to prevent said sled from shifting from side to side while moving on said platform.

15. The system of claim 9 wherein said pair of side longitudinal beams and said inner longitudinal beam of said platform are hollow inside for telescopicably receiving said pair of longitudinal side rails and said inner longitudinal rail of said ramp.

* * * * *